US010660475B2

(12) United States Patent
Turcotte

(10) Patent No.: US 10,660,475 B2
(45) Date of Patent: May 26, 2020

(54) MECHANICAL FILTER FOR FRYER AND FILTERING MEMBRANE SUPPORT FOR SAME

(71) Applicant: QUALI-FRIT INC., Sainte-Agathe-de-Lotbinière (CA)

(72) Inventor: Mario Turcotte, Sainte-Agathe-de-Lotbinière (CA)

(73) Assignee: Quali-Frit Inc., Quebec (CA)

( * ) Notice: Subject to any disclaimer, the term of this patent is extended or adjusted under 35 U.S.C. 154(b) by 523 days.

(21) Appl. No.: 15/521,550

(22) PCT Filed: Oct. 22, 2015

(86) PCT No.: PCT/CA2015/051076
§ 371 (c)(1),
(2) Date: Apr. 24, 2017

(87) PCT Pub. No.: WO2016/061694
PCT Pub. Date: Apr. 28, 2016

(65) Prior Publication Data
US 2017/0311758 A1    Nov. 2, 2017

Related U.S. Application Data

(60) Provisional application No. 62/205,915, filed on Aug. 17, 2015, provisional application No. 62/067,111, filed on Oct. 22, 2014.

(51) Int. Cl.
*A47J 37/12* (2006.01)
*C11B 13/00* (2006.01)
(Continued)

(52) U.S. Cl.
CPC .......... *A47J 37/1223* (2013.01); *B01D 35/28* (2013.01); *C11B 3/008* (2013.01); *C11B 13/00* (2013.01); *Y02W 30/74* (2015.05)

(58) Field of Classification Search
CPC ............................................. A47J 37/12–1295
See application file for complete search history.

(56) References Cited

U.S. PATENT DOCUMENTS 3,363,541 A    1/1968  Anetsberger
3,937,136 A    2/1976  Cox
(Continued)

FOREIGN PATENT DOCUMENTS

EP        148556        7/1985
EP     1842469 A1    10/2007
(Continued)

OTHER PUBLICATIONS

Extended European Search Report for Application No. 15852554.3, dated Aug. 10, 2018, 7 pages.
(Continued)

*Primary Examiner* — Michael A Laflame, Jr.
(74) *Attorney, Agent, or Firm* — Hahn Loeser & Parks LLP; Bret A. Hrivnak

(57) ABSTRACT

A mechanical filter for a deep fryer having a fry pot. The mechanical filter comprises a filtering membrane support comprising a plurality of links pivotally connected to one another. The filtering membrane support has a longitudinal axis. The mechanical filter also comprises a filtering membrane engageable with the plurality of links and defining transversally extending particle retaining cavities therewith. The filtering membrane extends along the longitudinal axis of the filtering membrane support. A filtering membrane support is also provided.

20 Claims, 10 Drawing Sheets

(51) Int. Cl.
*C11B 3/00* (2006.01)
*B01D 35/28* (2006.01)

(56) References Cited

U.S. PATENT DOCUMENTS

| | | | | |
|---|---|---|---|---|
| 3,948,160 | A | * | 4/1976 | Stickle .................. A21B 5/08 |
| | | | | 99/404 |
| 4,152,975 | A | | 5/1979 | Jones |
| 4,487,691 | A | | 12/1984 | Panora |
| 5,629,039 | A | | 5/1997 | Brintle |
| 6,152,023 | A | * | 11/2000 | Lihotzky-Vaupel ........................ |
| | | | | A47J 37/1214 |
| | | | | 99/330 |
| 6,364,120 | B1 | | 4/2002 | Sanchez et al. |
| 6,658,992 | B2 | * | 12/2003 | Zelander ................. A21B 3/18 |
| | | | | 99/353 |
| 7,098,427 | B2 | | 8/2006 | Ducarme et al. |
| 7,717,030 | B2 | * | 5/2010 | Henson ................ A47J 37/1214 |
| | | | | 99/404 |
| 2010/0218689 | A1 | | 9/2010 | Mickelson |
| 2012/0070553 | A1 | | 3/2012 | Hockett et al. |
| 2013/0327225 | A1 | | 12/2013 | Chappell et al. |

FOREIGN PATENT DOCUMENTS

| | | |
|---|---|---|
| FR | 2846218 A1 | 4/2004 |
| NL | 2003740 C | 5/2011 |

OTHER PUBLICATIONS

Ace Filters International, Frymate, https://www.acefilters.net/hospitality 2017.
DF Boss, http://www.deepfryerscreens.com/pics.htm, 2013.

* cited by examiner

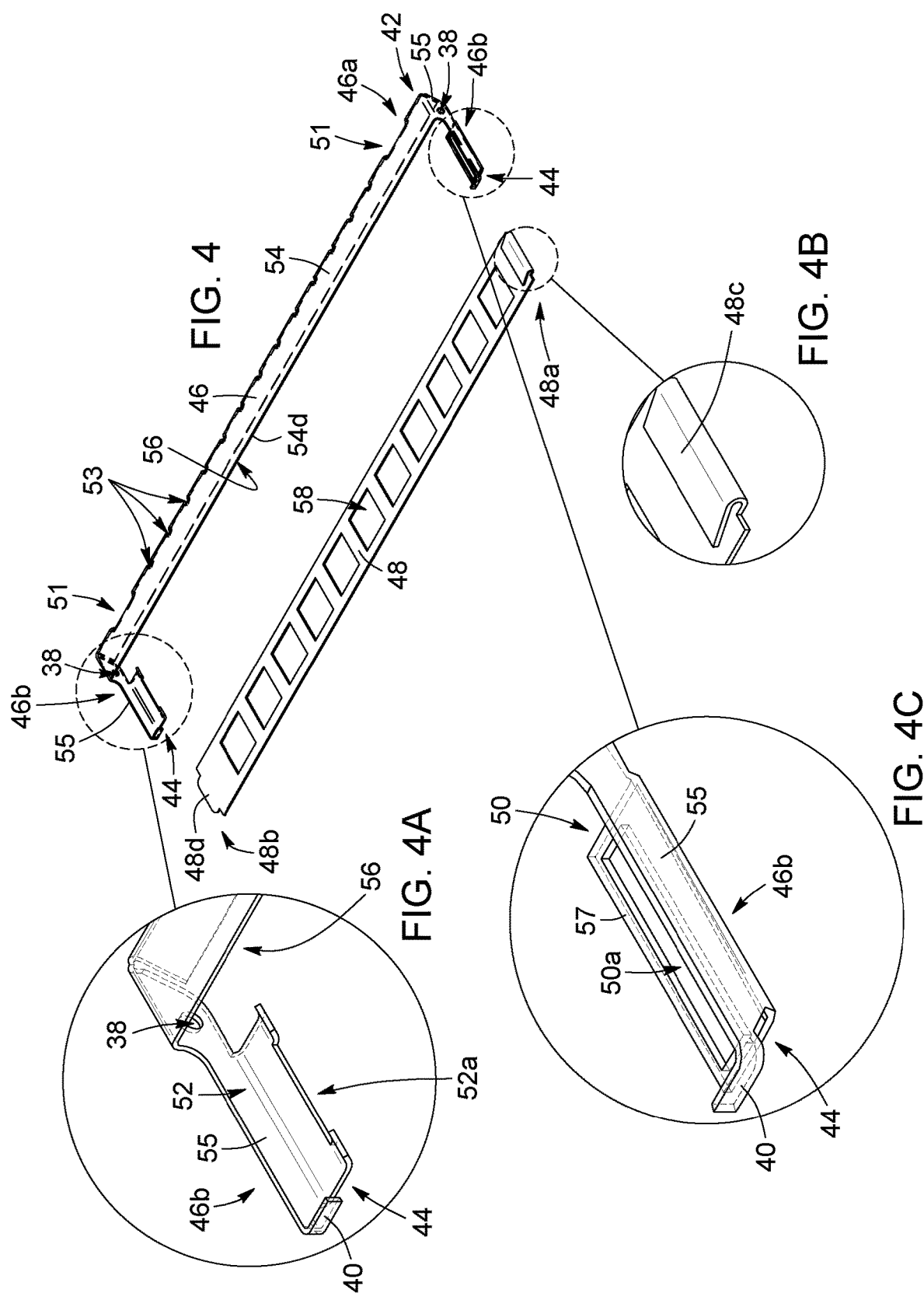

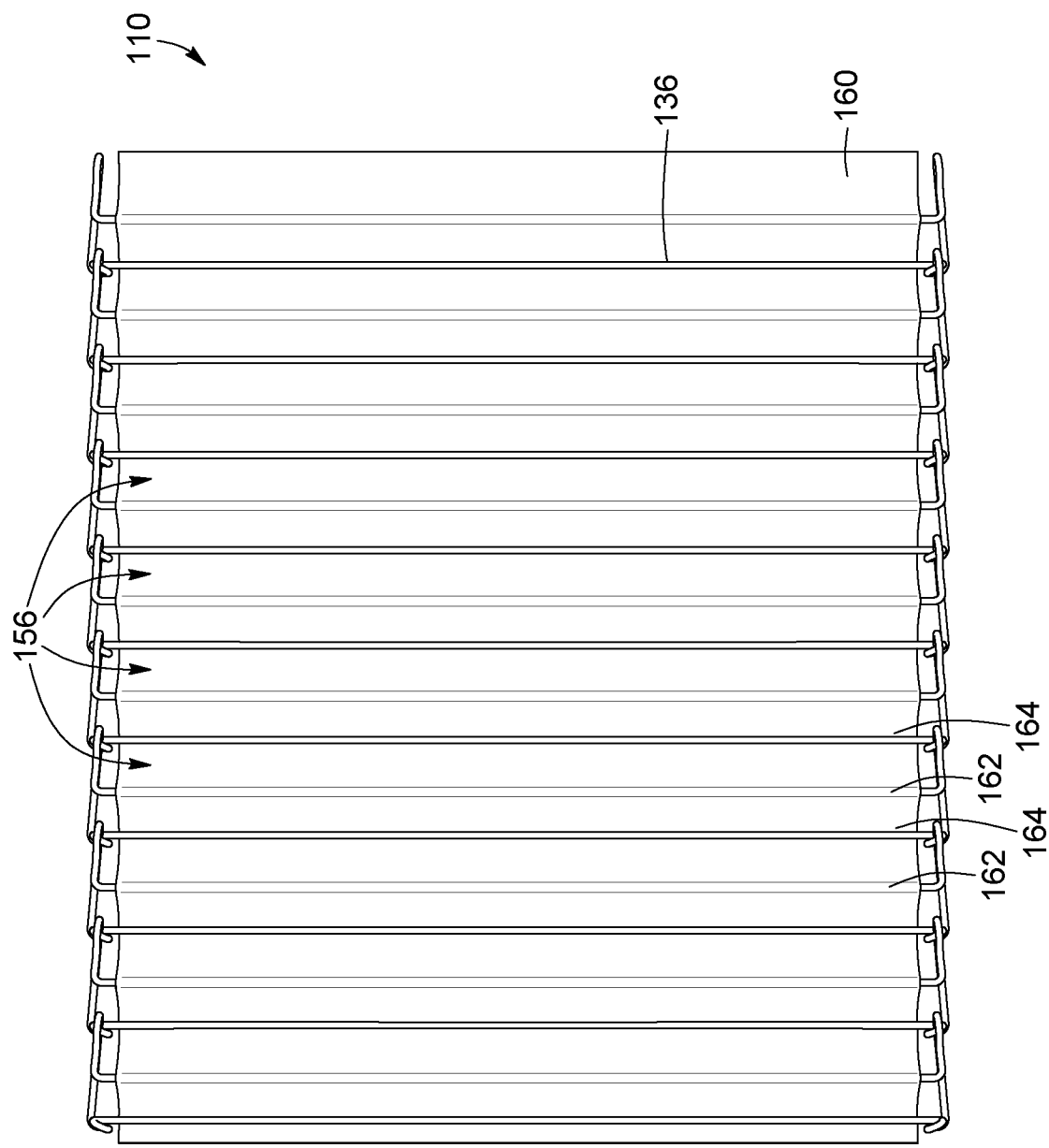

MECHANICAL FILTER FOR FRYER AND FILTERING MEMBRANE SUPPORT FOR SAME

CROSS REFERENCE TO RELATED APPLICATION

This application claims the benefit under 35 U.S.C. § 119(e) of U.S. provisional patent applications Nos. 62/067,111 and 62/205,915 which were filed respectively on Oct. 22, 2014 and Aug. 17, 2015. The entirety of the aforementioned applications is herein incorporated by reference. This application is a national phase entry of PCT patent application serial number PCT/CA2015/051076, filed on Oct. 22, 2015, designating the United States of America.

FIELD OF THE INVENTION

The present invention relates to the field of filters for deep fryers. More particularly, it relates to a mechanical filter for a deep fryer and to a filtering membrane support to receive a filtering membrane such as to form a mechanical filter insertable in a deep fryer.

BACKGROUND

It is known in the art to use filters for collecting and removing food particles from the cooking oil of deep fryers, in order to extend the life of the cooking oil.

In many cases, the filtering of the cooking oil requires the deep fryer to be turned off and at least a portion of the cooking oil to be drained from the fry pot of the deep fryer, in order to pass the cooking oil through the filter and subsequently return the cooking oil into the fry pot. Given that, for filtration to be most efficient, it is usually recommended to filter hot cooking oil (i.e. cooking oil between 200° F. and 350° F.), manipulation of the cooking oil in order to perform such filtering often is hazardous.

Mobile or integrated systems which can perform the drainage, filtering and return of the cooking oil, without human manipulation, are known in the art. However, such systems tend to suffer from drawbacks. For example, these systems often require hazardous human intervention in order to unclog the outlet of the fry pot, such as the drain thereof, as the accumulated particles tend to clog the outlet during the draining stage.

Solutions have also been proposed in order to collect food particles from the cooking oil directly in the fry pot, using a removable mechanical filter inside the fry pot. Such solutions however also tend to suffer from several drawbacks. Indeed, in many cases, the mechanical filter maintains the collected food particles in the hot zone of the fry pot (i.e. in a section substantially leveled or above the heating elements), which results in an undesirable overcooking (or burning) of the collected food particles. Known mechanical filters, which are positionable into the cold zone of the fry pot, only cover a restricted section of the fry pot, over the drain, and do not provide optimal mechanical filtering, as a quantity of food particles can sink into the cold zone, outside of the area covered by the filter. Such particles can contribute to the above-described clogging of the drain of the fry pot if external filtering is performed. Moreover, mechanical filters, which are positionable into the cold zone of the fry pot, may not be adapted to particular types of fry pots, depending on the position of the heating elements which the mechanical filter has to go through in order to reach the cold zone.

In view of the above, there is a need for an improved filter for a deep fryer and filtering membrane support for same which, by virtue of its design and components, would be able to overcome or at least minimize some of the above-discussed prior art concerns.

SUMMARY OF THE INVENTION

According to a first general aspect, there is provided a mechanical filter for a deep fryer having a fry pot. The mechanical filter comprises a filtering membrane support comprising a plurality of links pivotally connected to one another. The filtering membrane support has a longitudinal axis. The mechanical filter also comprises a filtering membrane engageable with the plurality of links and defining transversally extending particle retaining cavities therewith. The filtering membrane extends along the longitudinal axis of the filtering membrane support.

In an embodiment, each one of the plurality of links of the filtering membrane support comprises an upper filtering membrane engaging member and a lower filtering membrane engaging member vertically spaced apart from one another.

In an embodiment, each one of the plurality of links of the filtering membrane support comprises at least one link engaging section being pivotally engageable with a corresponding link engaging section of an adjacent one of the plurality of links.

In an embodiment, each one of the at least one link engaging section comprises a connecting assembly comprising a connecting loop at a first end and a receiving ring at a second end.

In an embodiment, each one of the plurality of links of the filtering membrane support comprises two link engaging sections, each one of the two link engaging sections being positioned at a respective end of the upper filtering membrane engaging member and the lower filtering membrane.

In an embodiment, each one of the plurality of links comprises a particle retaining member and a filtering membrane retaining member cooperating therewith to maintain the filtering membrane engaged inbetween. The particle retaining member comprises a particle receiving section including a particle retaining wall defining a particle retaining cavity in combination with the filtering membrane and at least one link engaging section pivotally engageable with a corresponding link engaging section of an adjacent one of the plurality of links.

In an embodiment, the particle retaining wall comprises at least one oil runoff aperture defined therein.

In an embodiment, the particle retaining wall includes a first wall section and a second wall section defining an oblique angle. The first wall section and the second wall section of the particle retaining wall together form the particle retaining cavity in combination with the filtering membrane.

In an embodiment, the particle retaining wall comprises a plurality of spaced-apart oil runoff apertures defined at a junction of the first wall section and the second wall section thereof.

In an embodiment, the mechanical filter further comprises at least one handle mounted to the filtering membrane support. The at least one handle is engageable to an upper edge of the fry pot when the mechanical filter is inserted therein.

According to another general aspect, there is also provided a filtering membrane support configured to receive a filtering membrane therein to form a mechanical filter for a deep fryer having a fry pot with cooking oil therein. The filtering membrane support comprises a plurality of links pivotally connected to one another. Each one of the plurality of links is engageable by the filtering membrane to define transversally extending particle retaining cavities permeable to the cooking oil.

In an embodiment, each one of the plurality of links comprises an upper filtering membrane engaging member and a lower filtering membrane engaging member vertically spaced apart from one another.

In an embodiment, each one of the plurality of links comprises at least one link engaging section pivotally engageable with a corresponding link engaging section of an adjacent one of the plurality of links.

In an embodiment, each one of the at least one link engaging section comprises a connecting assembly comprising a connecting loop at a first end and a receiving ring at a second end.

In an embodiment, each one of the plurality of links of the filtering membrane support comprises two link engaging sections. Each one of the two link engaging sections is positioned at a respective end of the upper filtering membrane engaging member and the lower filtering membrane.

In an embodiment, each one of the plurality of links comprises a particle retaining member and a filtering membrane retaining member cooperating therewith to maintain the filtering membrane engaged inbetween. The particle retaining member comprises a particle receiving section including a particle retaining wall defining the particle retaining cavity in combination with the filtering membrane and at least one link engaging section pivotally engageable with a corresponding link engaging section of an adjacent one of the plurality of links.

In an embodiment, the particle retaining wall comprises at least one oil runoff aperture defined therein.

In an embodiment, the particle retaining wall includes a first wall section and a second wall section defining an oblique angle. The first wall section and the second wall section of the particle retaining wall together form the particle retaining cavity in combination with the filtering membrane.

In an embodiment, the particle retaining wall comprises a plurality of spaced-apart oil runoff apertures defined at a junction of the first wall section and the second wall section thereof.

In an embodiment, the filtering membrane support further comprises at least one handle mounted to the filtering membrane support. The at least one handle is engageable to an upper edge of the fry pot when the mechanical filter is inserted therein.

According to another general aspect, there is also provided a mechanical filter for a deep fryer having a fry pot. The mechanical filter comprises a filtering membrane and a filtering membrane support comprising a plurality of links pivotally connected to one another. Each one of the plurality of links comprises a particle retaining member and a filtering membrane retaining member cooperating therewith to maintain the filtering membrane engaged inbetween.

In an embodiment, the particle retaining member comprises a particle receiving section including a particle retaining wall defining a particle retaining cavity in combination with the filtering membrane and at least one link engaging section pivotally engageable with a corresponding link engaging section of an adjacent one of the plurality of links.

In an embodiment, the particle retaining wall comprises at least one oil runoff aperture defined therein.

In an embodiment, the particle retaining wall includes a first wall section and a second wall section defining an oblique angle. The first wall section and the second wall section of the particle retaining wall together form the particle retaining cavity in combination with the filtering membrane.

In an embodiment, the particle retaining wall comprises a plurality of spaced-apart oil runoff apertures defined at a junction of the first wall section and the second wall section thereof.

In an embodiment, the mechanical filter comprises two link engaging sections with each one of the two link engaging sections comprising a wall assembly extending from a respective end of the particle retaining wall and closing laterally the particle retaining cavity.

In an embodiment, each wall assembly comprises a receiving bore and an extension pin at a second end. The extension pins of a first one of the links are engageable in a respective one of the receiving bores of a second one of the links.

In an embodiment, the filtering membrane retaining member comprises a first end pivotally engaged to a first one of the two link engaging sections and a second end removably engageable to a second one of the two link engaging sections.

In an embodiment, the mechanical filter further comprises at least one handle mounted to the filtering membrane support. The at least one handle is engageable to an upper edge of the fry pot when the mechanical filter is inserted therein.

A filtering membrane support configured to receive a filtering membrane therein to form a mechanical filter for a deep fryer having a fry pot. The filtering membrane support comprises a plurality of links pivotally connected to one another. Each one of the plurality of links comprises a particle retaining member and a filtering membrane retaining member cooperating therewith to maintain the filtering membrane engaged inbetween.

In an embodiment, the particle retaining member comprises a particle receiving section including a particle retaining wall defining a particle retaining cavity in combination with the filtering membrane and at least one link engaging section pivotally engageable with a corresponding link engaging section of an adjacent one of the plurality of links.

In an embodiment, the particle retaining wall comprises at least one oil runoff aperture defined therein.

In an embodiment, the particle retaining wall includes a first wall section and a second wall section defining an oblique angle. The first wall section and the second wall section of the particle retaining wall together form the particle retaining cavity in combination with the filtering membrane.

In an embodiment, the particle retaining wall comprises a plurality of spaced-apart oil runoff apertures defined at a junction of the first wall section and the second wall section thereof.

In an embodiment, the mechanical filter comprises two link engaging sections with each one of the two link engaging sections comprising a wall assembly extending from a respective end of the particle retaining wall and closing laterally the particle retaining cavity.

In an embodiment, each wall assembly comprises a receiving bore and an extension pin. The extension pins of a first one of the links are engageable in a respective one of the receiving bores of a second one of the links.

In an embodiment, the filtering membrane retaining member comprises a first end pivotally engaged to a first one of the two link engaging sections and a second end removably engageable to a second one of the two link engaging sections.

In an embodiment, the filtering membrane support further comprises at least one handle mounted to the filtering membrane support. The at least one handle is engageable to an upper edge of the fry pot when the mechanical filter is inserted therein.

According to another general aspect, there is also provided a mechanical filter for a deep fryer having a fry pot. The mechanical filter comprises a filtering membrane support including a plurality of links pivotally connected to one another and at least one filtering membrane retaining member configured to maintain a filtering membrane engaged with the links.

According to another general aspect, there is provided a filtering membrane support to define a mechanical filter for a deep fryer having a fry pot in combination with a filtering membrane. The filtering membrane support comprises a plurality of links pivotally connected to one another, each link comprising an upper filtering membrane engaging member and a lower filtering membrane engaging member vertically spaced apart from one another.

In an embodiment, each one of the plurality of links comprises at least one link engaging section being pivotally engageable with a corresponding link engaging section of an adjacent one of the plurality of links.

In an embodiment, each one of the at least one link engaging section comprises a connecting assembly comprising a connecting loop at a first end and a receiving ring at a second end.

In an embodiment, each one of the plurality of links of the filtering membrane support comprises two link engaging sections, each one of the two link engaging sections being positioned at an end of the upper filtering membrane engaging member and the lower filtering membrane.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 4 is a perspective view of the link of the filtering membrane support of FIG. 3, wherein a particle retaining member and a filtering membrane retaining member of the link are disengaged from one another.

FIGS. 4A to 4C are perspective views, enlarged, of sections of the link of the filtering membrane support of FIG. 3, wherein FIG. 4A is a perspective view, enlarged and fragmented, of a first link engaging section of the particle retaining member, FIG. 4B is a perspective view, enlarged and fragmented, of a loop-shaped connecting strip of the filtering membrane retaining member, and FIG. 4C is a perspective view, enlarged, of a second link engaging section of the particle retaining member.

FIGS. 5a, 5b, and 5c are respectively a side perspective view, a front perspective view and a top plan view of a mechanical filter for a deep fryer in accordance with an embodiment wherein the filtering membrane inserted in the filtering membrane support defines a plurality of transversal particle retaining cavity.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the mechanical filter for a deep fryer and the filtering membrane support and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the mechanical filter for a deep fryer and the filtering membrane support, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
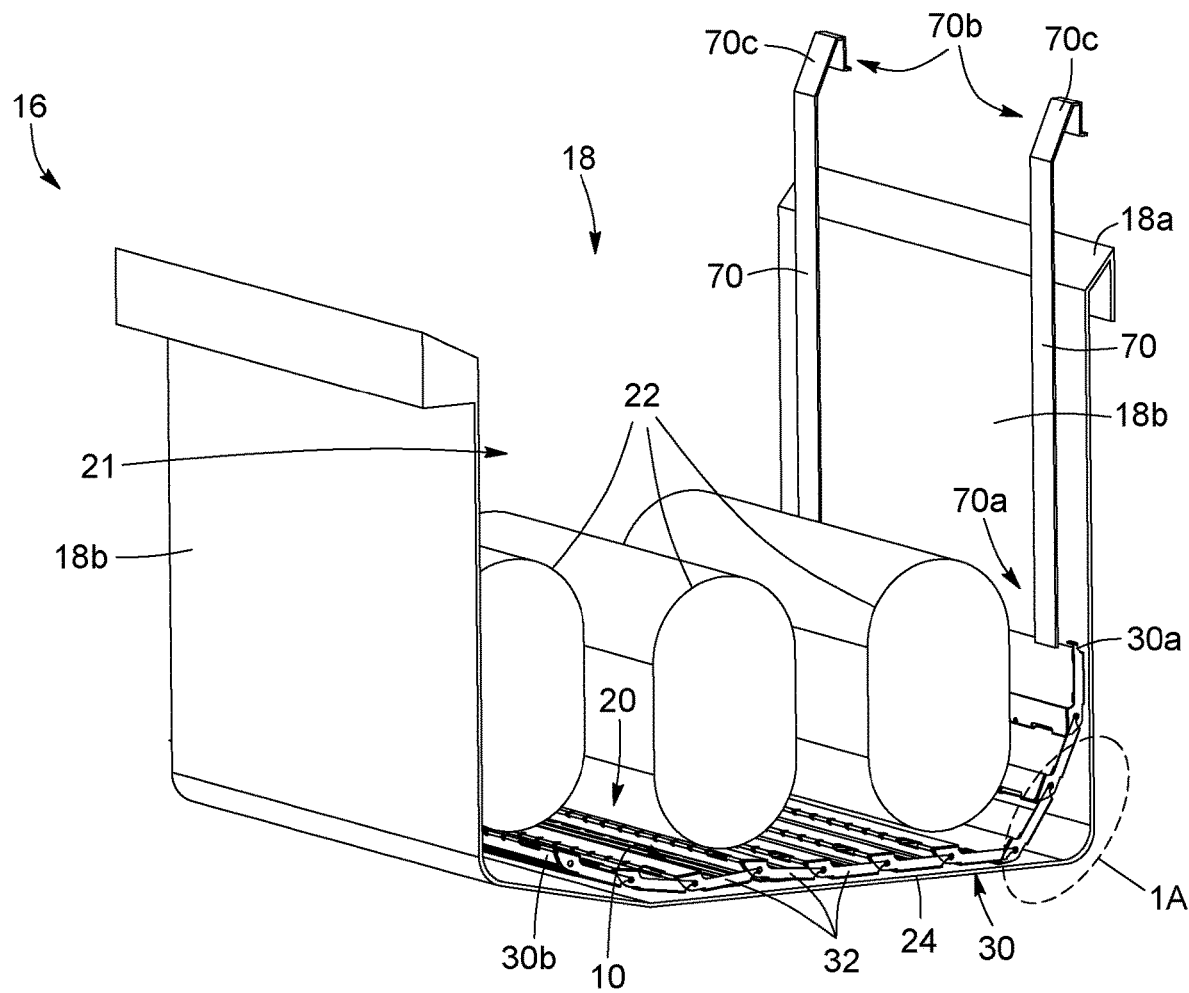
FIG. 1 is a schematic perspective view of a mechanical filter for a deep fryer in accordance with an embodiment wherein the mechanical filter includes a filtering membrane support having a plurality of links each including a particle retaining member, the mechanical filter being represented inside a fry pot of a deep fryer, wherein front and rear walls of the fry pot have been removed.

With reference to FIG. 1, there is shown a mechanical filter 10, in accordance with an embodiment, partially inserted in a cold zone 20 of a fry pot 18 of a deep fryer 16. In the course of the present document, the term "cold zone" 20 is used to refer to a zone of the fry pot 18 of the deep fryer 16 which is located below heating elements (or burners) 22 of the deep fryer 16 and above a bottom wall 24 of the fry pot 18. In FIG. 1, only the side walls 18b (with their upper edges 18a) of the fry pot 18 are shown. The front and rear walls are removed to show the heating elements 22 of the deep fryer 16. During operation of the deep fryer 16, the cooking oil contained in the cold zone 20 is generally cooler than the cooking oil contained in a hot zone 21 of the fry pot 18 (i.e. the zone of the fry pot 18 located at or above the heating elements 22). One skilled in the art will understand that during operation of the deep fryer 16, the cooking particles formed in the cooking oil flow downward and tend to accumulate in the cold zone 20. It is therefore advantageous to insert the mechanical filter 10 in the cold zone 20 in order to collect the cooking particles which accumulate therein by gravity and subsequently remove the mechanical filter 10 therefrom, along with the accumulated particles, for cleaning purposes.

Figure 1A:
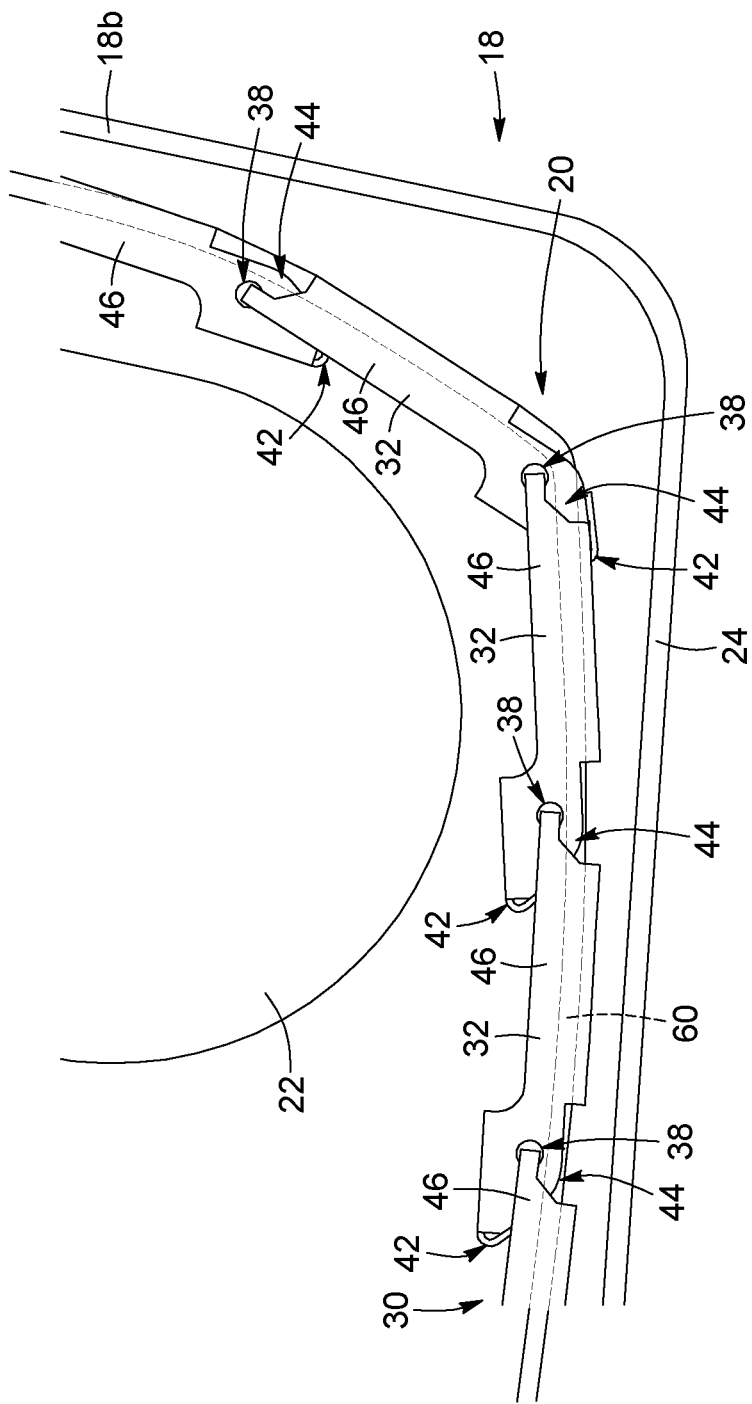
FIG. 1A is a side elevation view, enlarged and fragmented, of a section of the mechanical filter for a deep fryer shown of FIG. 1, inserted in the deep fryer.

Referring generally to FIGS. 1 and 1A, the mechanical filter 10 is removably insertable in the cold zone 20 of the fry pot 18 (i.e. under the heating elements 22 of the deep fryer 16) and is juxtaposable to the bottom wall 24 of the fry pot 18. In an embodiment, in an operative configuration, at least a portion of the mechanical filter 10 substantially lines the bottom wall 24 of the deep fryer 16. In an embodiment, the mechanical filter 10 lines at least 50% of the bottom wall 24 of the deep fryer 16. In the deep fryer 16 shown in FIG. 1, the heating elements 22 extend substantially horizontally above and spaced-apart from the bottom wall 24 and spaced apart from the side walls 18b. However, in an alternative embodiment (not shown), the mechanical filter 10 can also be used in a deep fryer 16 wherein the heating elements 22 are embedded in the side walls 18b of the fry pot 18.

Figure 2:
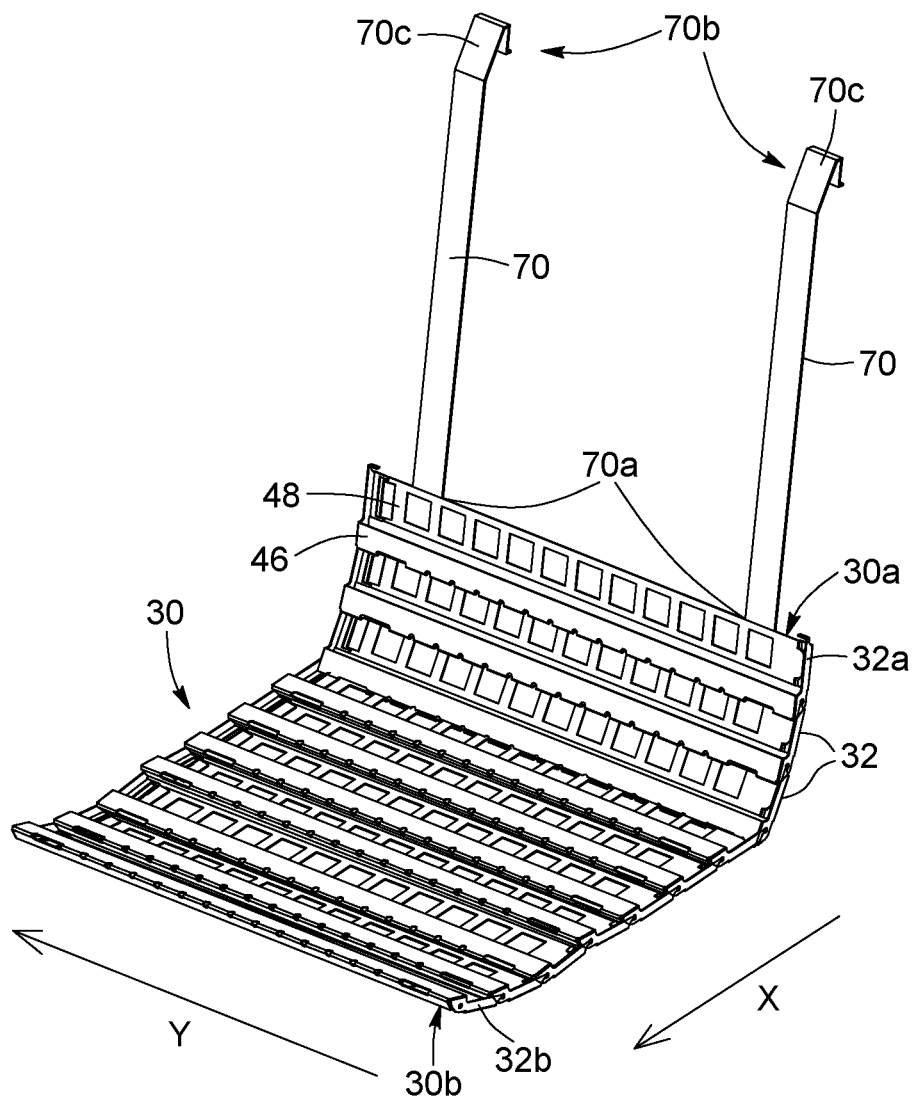
FIG. 2 is a perspective view of a filtering membrane support of the mechanical filter of FIG. 1.
Figure 3:
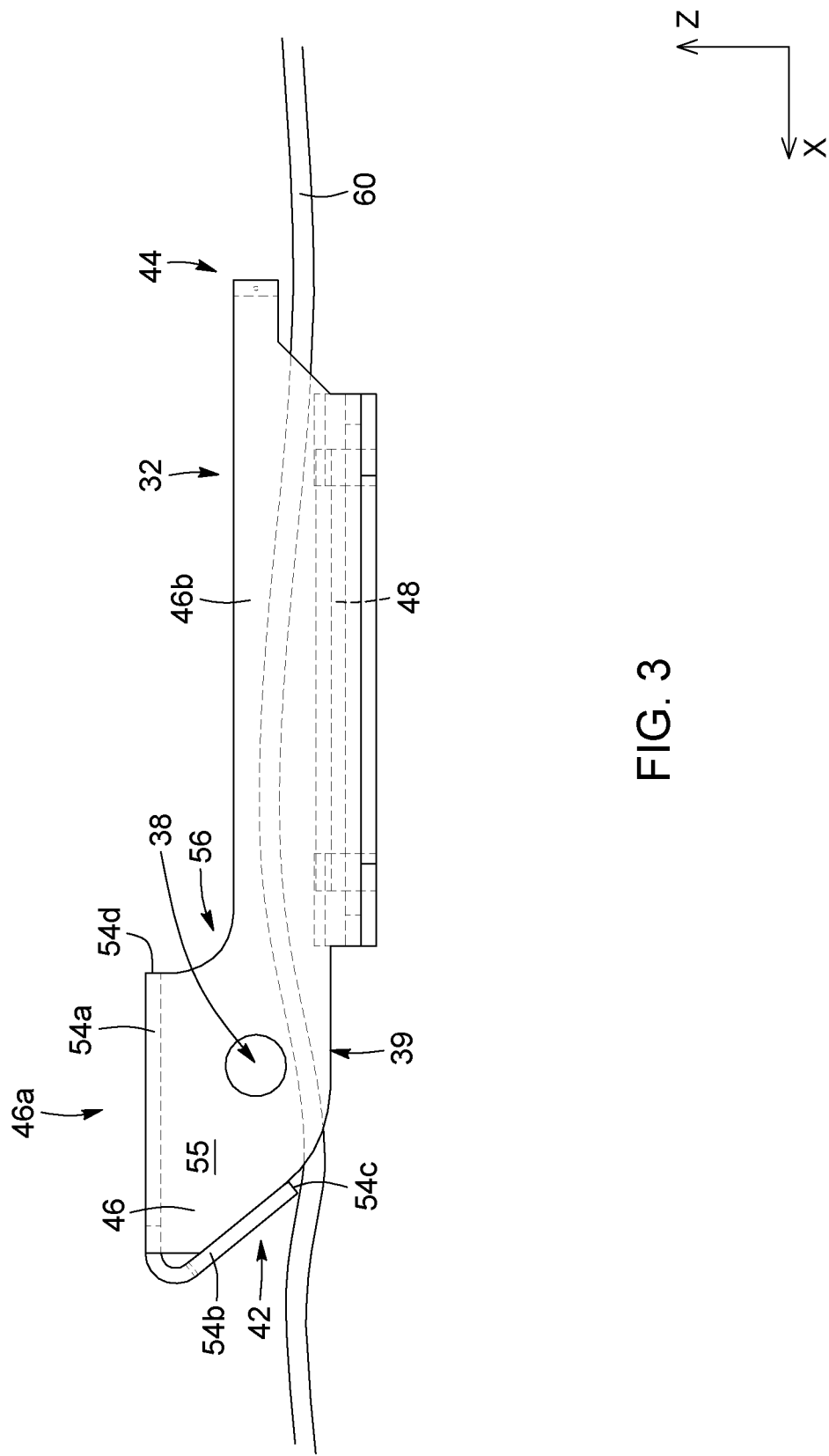
FIG. 3 is a side elevation view of a link of the filtering membrane support of FIG. 2, shown in a substantially horizontal orientation and with a section of a filtering membrane inserted therein.

In the embodiment shown, referring to FIGS. 2 and 3, the mechanical filter 10 includes a filtering membrane support 30 and a filtering membrane 60. The filtering membrane 60 is removably engageable with the filtering membrane support 30 and cooperates therewith to define the mechanical filter 10.

In an embodiment, in the operative configuration, the filtering membrane 60 substantially lines the bottom wall 24 of the fry pot 18 and retains, in collaboration with the filtering membrane support 30, the cooking particles, as will be described in more details below.

In an embodiment, the filtering membrane support 30 is flexible in order to be removably insertable in the fry pot 18, below the heating elements 22 (i.e. the shape of the filtering membrane support 30 is modifiable along its longitudinal axis X extending between a proximal end 30a and a distal end 30b thereof). In order to provide such flexibility, in an embodiment, the filtering membrane support 30 includes a plurality of links 32 pivotally connected to one another in a cascade arrangement, between the proximal end 30a and the distal end 30b of the filtering membrane support 30. In other words, each link 32 is pivotally connected to adjacent link(s) 32 and is pivotable about the adjacent link(s) 32 such that the filtering membrane support 30 is an overall flexible assembly along its longitudinal axis X. In the embodiments shown in the appended figures, the pivotal connection between the links 32 is provided by a male-female assembly, as will be described in more details below. However, one skilled in the art will understand that, in alternative embodiments, any types of connection providing the desired pivotability between the adjacent links 32 can be used.

The filtering membrane 60 is also made of a flexible material. Thus, when engaged with the filtering membrane support 30, the mechanical filter 10 remains flexible along its longitudinal axis X and follows the shape of the filtering membrane support 30.

In an embodiment, the mechanical filter 10 also includes at least one handle 70, mounted to the filtering membrane support 30. In the embodiment shown, two handles 70 are connected to the filtering member support 30 at the proximal end 30a. Each one of the handles 70 is mounted to the link 32 provided at the proximal end 30a of the filtering member support 30. Each one of the handles 70 extends from the filtering member support 30. The handles 70 are configured to facilitate handling of the mechanical filter 10, especially during insertion and removal from the fry pot 18. In the operative configuration, when the mechanical filter 10 is inserted in the cold zone 20 of the fry pot 18 of the deep fryer 16, under the heating elements 22, the handles 70 extend outwardly of the fry pot 18 (or at least close to the upper edge 18a of the fry pot 18). Thus, the handles 70 can be pulled to remove the mechanical filter 10 from the fry pot 18.

In the embodiment shown, the two handles 70 have a connecting end 70a secured to the proximal link 32a (i.e. the link 32 positioned at the proximal end 30a of the filtering member support 30) and have a hook section 70c at a handling end 70b, opposed to the connecting end 70a. As shown in FIG. 1, the hook section 70c of each handle 70 is configured to engage the upper edge 18a of the fry pot 18 when the mechanical filter 10 is inserted therein to maintain the mechanical filter 10 and allow easy removal of the mechanical filter 10, when desired. One skilled in the art will understand that, in an embodiment, only one handle 70 or more than two handles 70 can be provided. Moreover, the at least one handle 70 can be provided at the distal end 30b on the filtering membrane support 30, rather than the proximal end thereof. In another alternative embodiment where the mechanical filter 10 is designed to be used in a deep fryer 16 with heating elements 22 embedded in the side walls 18b of the fry pot 18 (i.e. heating elements not extending inside the fry pot), handles 70 can be provided at both the proximal end 30a and the distal end 30b of the filtering membrane support 30 to support the mechanical filter 10 at opposed ends thereof. Furthermore, the shape and the configuration of the handle(s) 70 can vary from the embodiment shown.

To insert the mechanical filter 10 in the fry pot 18, the mechanical filter 10 is inserted in the fry pot 18, close to one of the side walls 18b, with the filtering member support 30 oriented substantially vertically such as to travel between the side wall 18b and the adjacent heating element 22 (see FIG. 1). The mechanical filter 10 is subsequently displaced substantially vertically downwardly along the respective one of the side walls 18b. When the link 32 positioned at the distal end 30b of the filtering membrane support 30 abuts the bottom wall 24 of the fry pot 18, the shape of the mechanical filter 10 is modified to substantially conform to the shape of the side walls 18b and the bottom wall 24. In other words, the distal end link 32b pivots towards a substantially horizontal orientation to follow the bottom wall 24 and is followed by each one of the following links 32 (each link 32 pivoting between the substantially vertical orientation and the substantially horizontal orientation when reaching the bottom wall 24). The mechanical filter 10 is inserted in the fry pot 18 until it is configured in the operative configuration where, for instance, it substantially lines the bottom wall 24 of the fry pot 18. In the operative configuration, at least a portion of the mechanical filter 10 lines the bottom wall 24. In an embodiment, a section thereof, close to the proximal end 30a, lines a lower section of the side wall 18b of the deep fryer 16. In an alternative embodiment (not shown), the filtering member support 30 can be sized to solely line or partially line the bottom wall 24 of the deep fryer 16, in the operative configuration. In an embodiment, when the mechanical filter 10 has reached the operative configuration, the hook sections 70c, at the handling ends 70b of the handles 70, are engaged with the upper edge 18a of the fry pot 18.

It is appreciated that, in an alternative embodiment, the mechanical filter 10 can also be inserted between two consecutive heating elements 22.

After a time period in the operative configuration, the mechanical filter 10 can be removed from the fry pot 18 in order to remove the cooking particles which have accumulated over the mechanical filter 10 during this time period where it remained inserted in the cold zone 20 of the fry pot 18 and/or to replace the filtering membrane 60. For removing the mechanical filter 10 from the fry pot 18, the handle(s) 70 is/are seized and pulled upwardly and the mechanical filter 10 follows the same path until it is removed from the fry pot 18. In other words, the upward pulling on the handle(s) 70 causes the mechanical filter 10 to travel back between the side wall 18*b* of the fry pot 18 and the adjacent heating element 22. Sequentially, each one of the links 32 pivots between the substantially horizontal orientation and the substantially vertical orientation when reaching the corresponding side wall 18*b*. In an embodiment, the mechanical filter 10 can subsequently be cleaned to dismiss the cooking particles and/or replace the filtering membrane 60 and the mechanical filter 10 can be reinserted inside the fry pot 18.

Referring now to FIGS. 3, 4A, 4B, and 4C, a first embodiment of the mechanical filter 10 will be described in more details. In the embodiment shown, each one of the links 32, connectable to define the filtering membrane support 30, includes a particle retaining member 46 (or upper filtering membrane engaging member) and a filtering membrane retaining member 48 (or lower filtering membrane engaging member) cooperating together to maintain the filtering membrane 60 engaged with each link 32. In the embodiment shown, and as will be described in more details below, the filtering membrane retaining member 48 is pivotally mounted to the particle retaining member 46. However, one skilled in the art will understand that, in an alternative embodiment, the filtering membrane retaining member 48 can be integral with the particle retaining member 46 or entirely disengageable from the particle retaining member 46.

When engaged together, the particle retaining member 46 and the filtering membrane retaining member 48 are configured and positioned such that the filtering membrane 60 can be inserted inbetween, as shown in FIG. 3. When the filtering membrane 60 is inserted inbetween, the filtering membrane retaining member 48 supports and maintains the filtering membrane 60 engaged with the filtering membrane support 30 while the particle retaining member 46 cooperates with the filtering membrane 60 to provide filtration of the cooking oil inside the fry pot 18 of the deep fryer 16 and the removal of cooking particles from the cooking oil, when the mechanical filter 10 is removed from the fry pot 18, as will be described in more details below.

In an embodiment, in reference to FIGS. 2, 3, 4A and 4C, the particle retaining member 46 includes a particle receiving section 46*a* and two link engaging sections 46*b*. More particularly, the particle receiving section 46*a* comprises a transversally extending particle retaining wall 54 (i.e. a wall extending along a transversal axis Y with respect to the longitudinal axis X) defining a transversally extending particle retaining cavity 56 in combination with the filtering membrane 60 engageable therewith. In the embodiment shown, the particle retaining wall 54 is curved shaped. More particularly, it has a substantially hook shape (or J-shaped) with a first wall section 54*a* and a second wall section 54*b* defining an oblique angle together to form the particle retaining cavity 56 in combination with the filtering membrane 60 engageable therewith. It is appreciated that the shape of the particle retaining wall 54 can vary from the embodiment shown. For instance and without being limitative, it can include one or more wall sections. In an embodiment, the particle retaining cavity 56 can be defined solely by the particle retaining wall 54.

In the embodiment shown, each one of the link engaging sections 46*b* includes a wall assembly 55 extending from a respective end of the transversally extending particle retaining wall 54. Each one of the wall assembly 55 of the corresponding link engaging section 46*b* comprises a receiving bore 38, at a first end 42 close to the particle retaining wall 54, and an extension pin 40 (FIG. 4C), at a second end 44 opposed to the particle retaining wall 54. The extension pins 40 of a first one of the links 32 are engageable in a respective one of the receiving bores 38 of a second one of the links 32, adjacent to the first one of the links 32, to pivotally engage two links 32 together. Thus, when received in a respective one of the receiving bores 38, the extension pins 40 can pivot therein. It is appreciated that the filtering membrane support 30 comprises a plurality of links 32 pivotally engaged together through engagement of complementary receiving bores 38 and extension pins 40. Hence, two adjacent links 32 are pivotally engageable with one another, through the link engaging section 46*b* of one link 32 being pivotally engageable with a corresponding link engaging section 46*b* of an adjacent link 32 and adjacent links 32 can pivot with respect to one another and provide the flexibility to the filtering membrane support 30 along its longitudinal axis X. One skilled in the art would however understand that, in alternative embodiments, other complementary male and female members different from the embodiment shown can be provided. Furthermore, the adjacent links 32 can be pivotally engageable together through other connecting assemblies such as and without being limitative, hinges or the like.

The wall assemblies 55 close laterally the particle retaining cavity 56 defined by the particle retaining wall 54 and the filtering membrane 60, as will be described in more details below.

FIG. 3 shows one of the links 32, with the filtering membrane 60 engaged therewith, in a substantially horizontal orientation, which corresponds to the operating configuration where the mechanical filter 10 substantially lines the bottom wall 24 of the deep fryer 16 (see FIG. 1). The filtering membrane 60 extends between a free edge 54*c* of the particle retaining wall 54 and the filtering membrane retaining member 48, with the filtering membrane retaining member 48 and the particle retaining wall 54 extending respectively below and above the filtering membrane 60. Thus, vertical displacement of the filtering membrane 60 is prevented by the particle retaining wall 54 and the filtering membrane retaining member 48. On its lateral sides, the filtering membrane 60 is contained between the two spaced-apart wall assemblies 55 of the link engaging sections 46*b*. The filtering membrane 60 extends in a first aperture 39 defined between the first free edge 54*c* of the particle retaining wall 54 and the filtering membrane retaining member 48. A second free edge 54*d* of the particle retaining wall 54 is spaced-apart from the filtering membrane retaining member 48 such as to define the particle retaining cavity 56.

In the embodiment shown, the free edges 54*c*, 54*d* of the particle retaining wall 54 are spaced-apart vertically and horizontally (in the operative configuration of the mechanical filter 10 in the deep fryer 16) to define the particle retaining cavity 56 in combination with the filtering membrane 60 engageable therewith. In other words, in the embodiment shown, the free edges 54*c*, 54*d* of the particle retaining wall 54 are spaced-apart along the longitudinal axis X and a vertical axis Z extending perpendicularly to the longitudinal axis X. However, in an alternative embodiment, the free edges 54*c*, 54*d* of the particle retaining wall 54 can be spaced-apart only vertically (i.e. both wall sections 54*a*, 54*b* can have substantially the same length).

As shown in FIG. 4, the particle retaining wall 54 comprises a plurality of spaced-apart oil runoff apertures 53 defined therein. In the embodiment shown, the oil runoff apertures 53 are spaced-apart along the length of the particle retaining wall 54 and are defined in a bottom of the particle retaining cavity 56, at the junction of the wall sections 54a, 54b. Each oil runoff aperture 53 is a through hole sized and shaped to allow the passage of cooking oil contained in the particle retaining cavity 56 therethrough, while substantially preventing the passage of cooking particles. In the embodiment shown, a plurality of oil runoff apertures 53 are provided to allow the discharge of cooking oil, as will be better understood in view of the description below. One skilled in the art will understand that, in an alternative embodiment, the oil runoff apertures 53 can be replaced by an equivalent structure allowing the passage of cooking oil therethrough while substantially preventing the passage of cooking particles, such as, for example and without being limitative, a mesh section or the like. In an embodiment, the particle retaining wall 54 can be at least partially lined with a mesh material.

In some implementations, one or several links 32 can include at least one membrane retaining aperture 51 defined in the particle retaining wall 54. In an embodiment, at least the link 32 provided at the distal end 30b of the filtering membrane support 30 comprises at least one membrane retaining aperture 51. For instance, in the embodiment shown, the particle retaining wall 54 comprises two membrane retaining apertures 51, each one being positioned at a respective end of the particle retaining wall 54 proximate to the free edge 54c in a bottom of the particle retaining cavity 56, at the junction of the wall sections 54a, 54b. Each one of the membrane retaining apertures 51 is sized and shaped to receive therein a membrane retaining member (not shown) extending outwardly from an edge of the filtering membrane 60 in order to secure the filtering membrane 60 to the link 32. For instance, in an embodiment, the filtering membrane 60 can be substantially rectangular in shape but with narrow sections extending from an edge thereof. The narrow sections can be insertable in a respective one of the membrane retaining apertures 51 to further maintain the filtering membrane 60 engaged with the filtering membrane support 30, in the predetermined configuration.

As mentioned above, the filtering membrane retaining member 48 and the particle retaining member 46 cooperate to maintain the filtering membrane 60 engaged with the filtering membrane support 30. As mentioned above, in the embodiment shown, the filtering membrane retaining member 48 is pivotally mounted to the particle retaining member 46. Thus, it can be selectively configured in an open configuration and an engaged configuration. In the open configuration, one of the ends 48b of the filtering membrane retaining member 48 is disengaged from the particle retaining member 46 to facilitate insertion and removal of the filtering membrane 60 therebetween. In the engaged configuration, the two opposed ends 48a, 48b of the filtering membrane retaining member 48 are engaged with a respective one of the link engaging section 46b to maintain the filtering membrane 60 between the filtering membrane retaining member 48 and the particle retaining member 46.

As mentioned above, in an alternative embodiment (not shown), the filtering membrane retaining member 48 and the particle retaining member 46 can be permanently engaged together and the filtering membrane 60 can be engaged with the filtering membrane support 30 by inserting the filtering membrane 60 in successive apertures 39. In another alternative embodiment (not shown), the filtering membrane retaining member 48 and the particle retaining member 46 can be disengageable at both ends thereof. Thus, to change the filtering membrane 60 therebetween, the filtering membrane retaining members 48 can be disengaged from each one of the particle retaining members 46, the used filtering membrane 60 can be removed, a new filtering membrane 60 can be abutted against the successively connected particle retaining members 46 and, the filtering membrane retaining members 48 can be re-engaged with a respective one of the particle retaining members 46.

In reference to FIGS. 4, 4A, 4B, and 4C, there is shown an embodiment where the filtering membrane retaining member 48 is pivotally mounted to a respective one of the particle retaining member 46. More particularly, in the embodiment shown, the link engaging sections 46b of the particle retaining member 46 each comprise a retaining member engaging projection 50, 52. Each one of the retaining member engaging projections 50, 52 extends inwardly from a respective one of the wall assemblies 55. In the embodiment shown, the first retaining member engaging projection 50 and the second retaining member engaging projection 52 are integral with the wall assembly 55 of the corresponding link engaging section 46b of the particle retaining member 46, a single piece of material being bended to define the above described particle retaining member 46, with the first retaining member engaging projection 50 and the second retaining member engaging projection 52 being inner extensions of the wall assemblies 55. One skilled in the art will however understand that, in an alternative embodiment, the first retaining member engaging projection 50 and the second retaining member engaging projection 52 can be mounted to the wall assemblies 55 by known mounting means or methods such as welding, soldering, riveting or the like.

In the embodiment shown, the two retaining member engaging projections 50, 52 are configured to pivotally secure a first end 48a of the filtering membrane retaining member 48 to the first retaining member engaging projection 50 and engage/disengage a second end 48b of the filtering membrane retaining member 48 to the second retaining member engaging projection 52.

Hence, in reference to FIG. 4C, the first retaining member engaging projection 50 of the projections includes a receiving slot 50a defined therein, closed by a pivot member 57, at a distal end, and configured to receive therein a loop-shaped connecting strip 48c extending from the first end 48a of the filtering membrane retaining member 48. The loop-shaped connecting strip 48c is engaged with the first retaining member engaging projection 50 with the pivot member 57 extending through the eye of the loop-shaped connecting strip 48c.

In reference to FIG. 4A, the second retaining member engaging projection 52 includes a receiving recess 52a defined in a distal edge thereof and configured to receive therein an engagement tab 48d extending from the second end 48b of the filtering membrane retaining member 48.

In an embodiment, the filtering membrane retaining member 48 is slightly longer than the spacing between the inner ends of the two retaining member engaging projections 50, 52 and is made of flexible material such that it can be momentarily bended in order to engage the engagement tab 48d in the receiving recess 52a or disengage the engagement tab 48d therefrom. It will be understood that, when the filtering membrane 60 is inserted between the particle retaining member 46 and the filtering membrane retaining member 48 and the engagement tab 48d is received in the receiving recess 52a, the engagement tab 48d is maintained between the second retaining member engaging projection 52 and the filtering membrane 60.

In view of the above, in the embodiment shown, the filtering membrane retaining member 48 can be engaged to the particle retaining member 46 (via the second retaining member engaging projection 52) to retain the filtering membrane 60 therebetween. The filtering membrane retaining member 48 can subsequently be disengaged from the second retaining member engaging projection 52 (by bending the filtering membrane retaining member 48 to disengage the engagement tab 48*d* from the receiving recess 52*a*) and pivoted away from the particle retaining member 46 about the pivot member 57 at the first end 48*a*, in the open configuration, to remove/replace the filtering membrane 60.

One skilled in the art will understand that, in alternative embodiments, assemblies distinct than the one described above can also be provided to allow engagement between the filtering membrane retaining member 48 and the particle receiving member 46. Moreover, even though, in the embodiment shown, the two retaining member engaging projections 50, 52 are different, in an alternative embodiment, they can be substantially similar. For example and without being limitative, in an embodiment, the above described engagement tab and recess assembly can also be provided between the first end 48*a* of the filtering membrane retaining member 48 and the first retaining member engaging projection 50, to allow removable engagement therebetween. In such an embodiment, the filtering membrane retaining member 48 and the particle retaining member 46 are disengageable at both ends thereof.

In an embodiment, the filtering membrane retaining member 48 also has a plurality of spaced-apart through holes 58 defined therein. The plurality of through holes 58 allow the cooking oil flowing through the filtering membrane 60 to flow through the filtering membrane retaining member 48, and thereby contribute to an overall permeability of the cooking oil through the mechanical filter 10.

In view of the above, in order to perform filtering of the cooking oil of a deep fryer 16 during the cooking of food therein, in the embodiment shown in FIGS. 1 to 4B, a filtering membrane 60 can be inserted and secured into the above described filtering membrane support 30, between the particle retaining member 46 and the filtering membrane retaining member 48 of each one of the consecutively and pivotally connected links 32. Subsequently, the mechanical filter 10 (formed by the assembly of the filtering membrane 60 and the filtering membrane support 30) can be inserted into the fry pot 18, in the cold zone 20, and maintained therein for a desired time period.

When the mechanical filter 10 is oriented in the substantially vertical orientation (for example during insertion and removal thereof from the fry pot 18), the mechanical filter 10 operates to retain the cooking particles in the particle retaining cavities 56 formed between the filtering membrane 60 and the particle retaining wall 54. The oil runoff apertures 53 allow the runoff of the cooking oil from the corresponding particle retaining cavity 56 while retaining the cooking particles therein.

Now referring to FIGS. 5*a* to 7, an alternative embodiment of the mechanical filter 110 wherein similar features are numbered using similar reference numerals in the 100 series will now be described. In the embodiment shown in FIGS. 5*a* to 7, the filtering membrane support 130 and corresponding filtering membrane 160 forming the mechanical filter 110 are shown outside of the fry pot (not shown), and oriented as if positioned in the operative configuration superposed to the bottom wall of the fry pot. One skilled in the art will however understand that the mechanical filter 110 can be used in a fry pot of a deep fryer, similarly to the mechanical filter 10 shown in FIGS. 1*a* to 4*c*. In the embodiment shown, the longitudinal axis X of the filtering membrane support 130 again extends between the proximal end 130*a* and a distal end 130*b* of the filtering membrane support 130 with the transversal axis Y extending transversally to the longitudinal axis X, along a width of the filtering membrane support 130. Moreover, the vertical axis Z extends perpendicularly to the longitudinal axis X and the transversal axis Y. Moreover, in the embodiment shown, the filtering membrane support 130 is shown with no handle connected thereto. However it will be understood that handles similar to the handles described in connection with the mechanical filter 10 shown in FIGS. 1*a* to 4*c* can be used with the membrane support 130 of the present embodiment.

Figure 6:
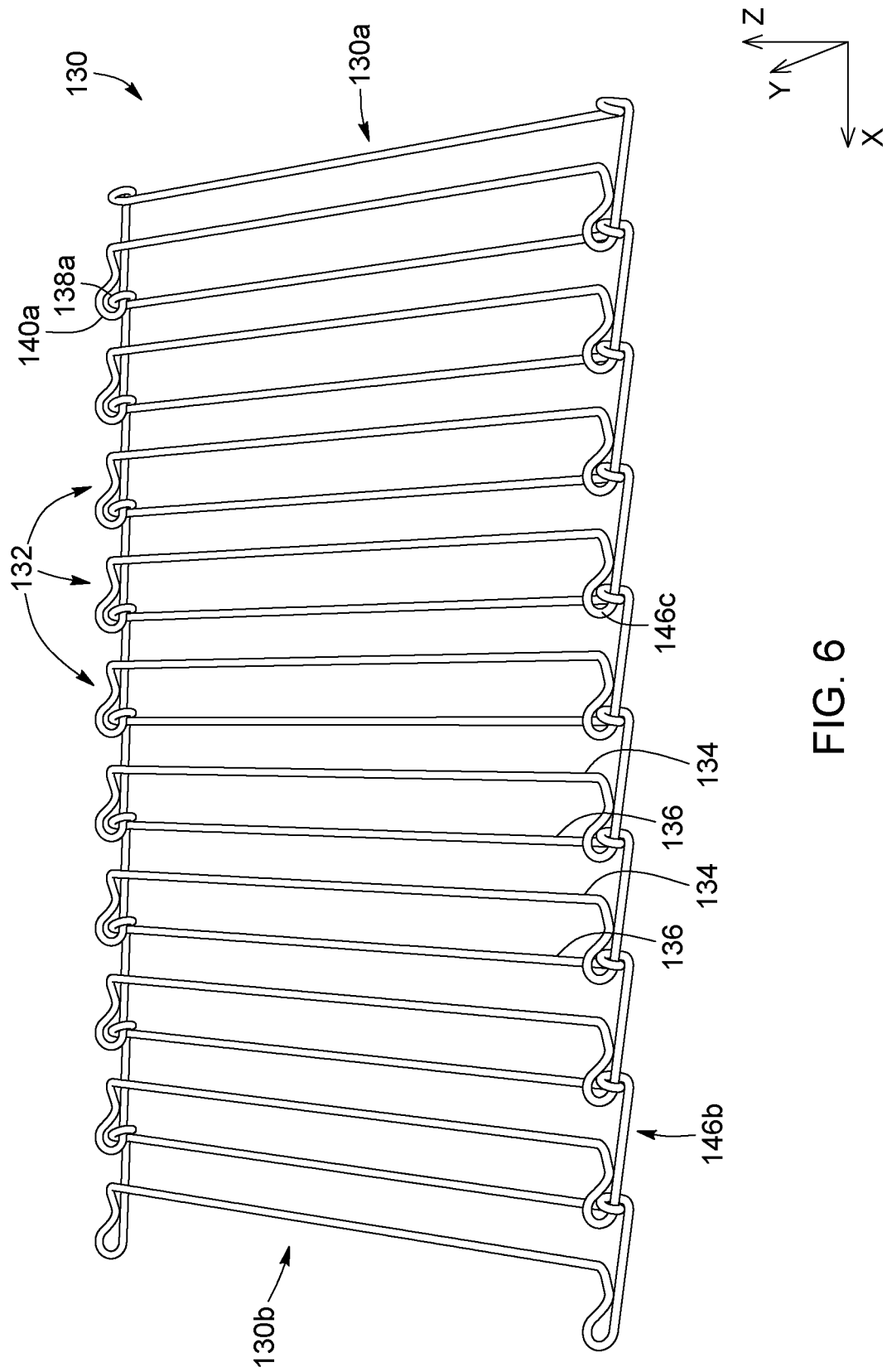
FIG. 6 is a side perspective view of the filtering membrane support of the mechanical filter of FIGS. 5a, 5b and 5c.
Figure 7:
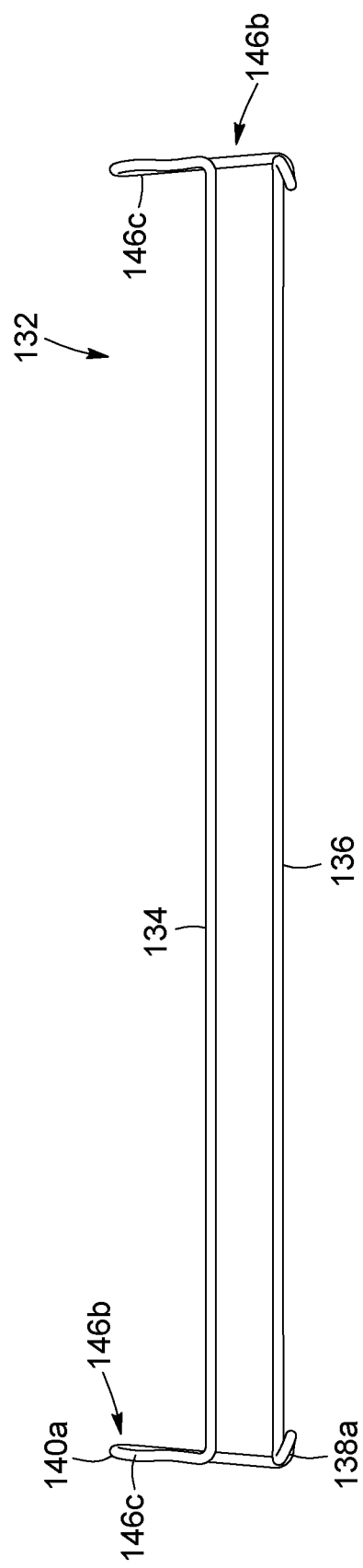
FIG. 7 is a perspective view of a link of the filtering membrane support of FIG. 6.

Referring to FIGS. 6 and 7, in the embodiment shown, the filtering membrane support 130 includes a plurality of links 132, connectable together to define the filtering membrane support 130. Each one of the links 132 includes a transversally extending upper filtering membrane engaging member 134 and a transversally extending lower filtering membrane engaging member 136.

Figure 5A:
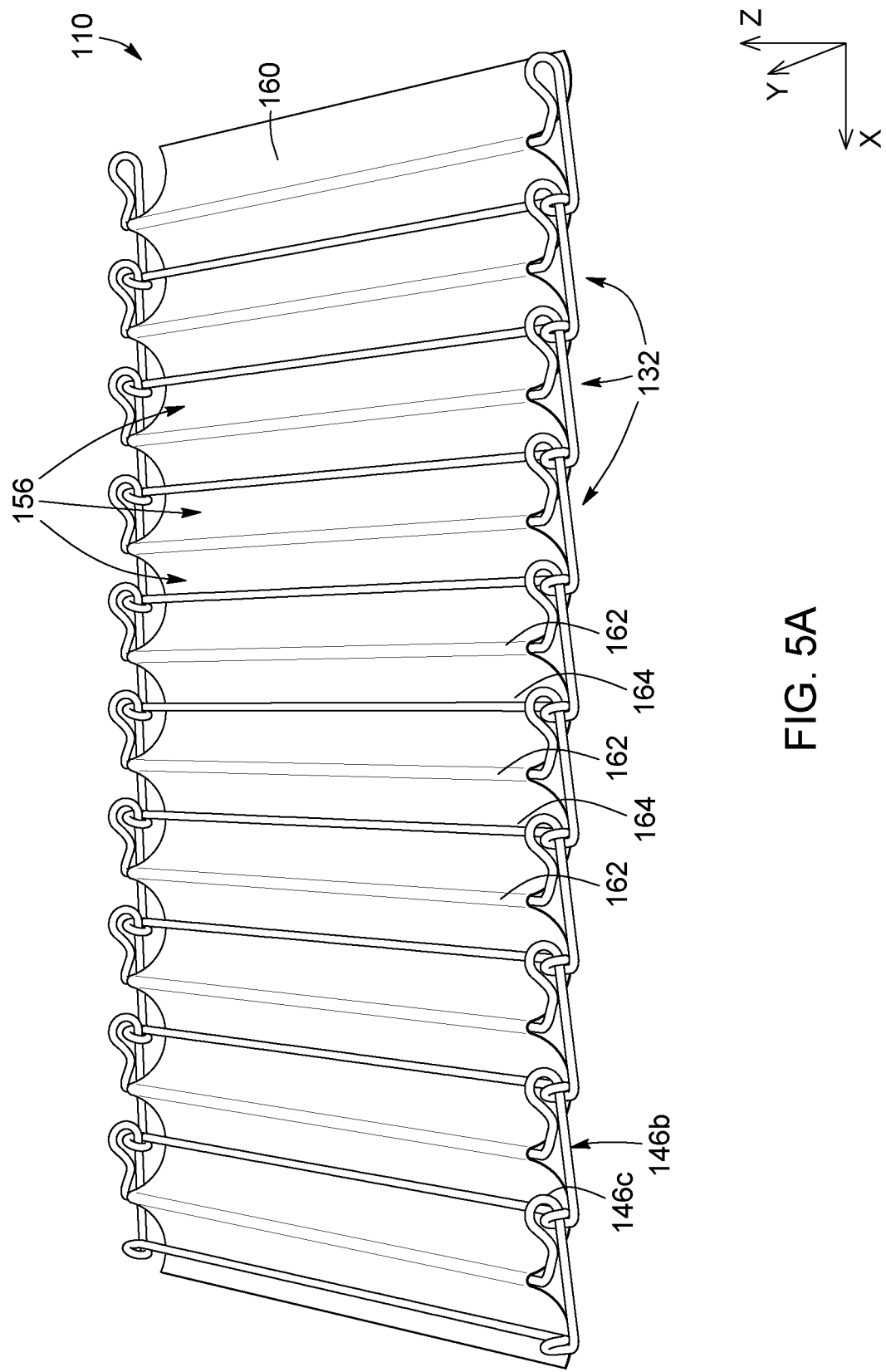
Figure 5B:
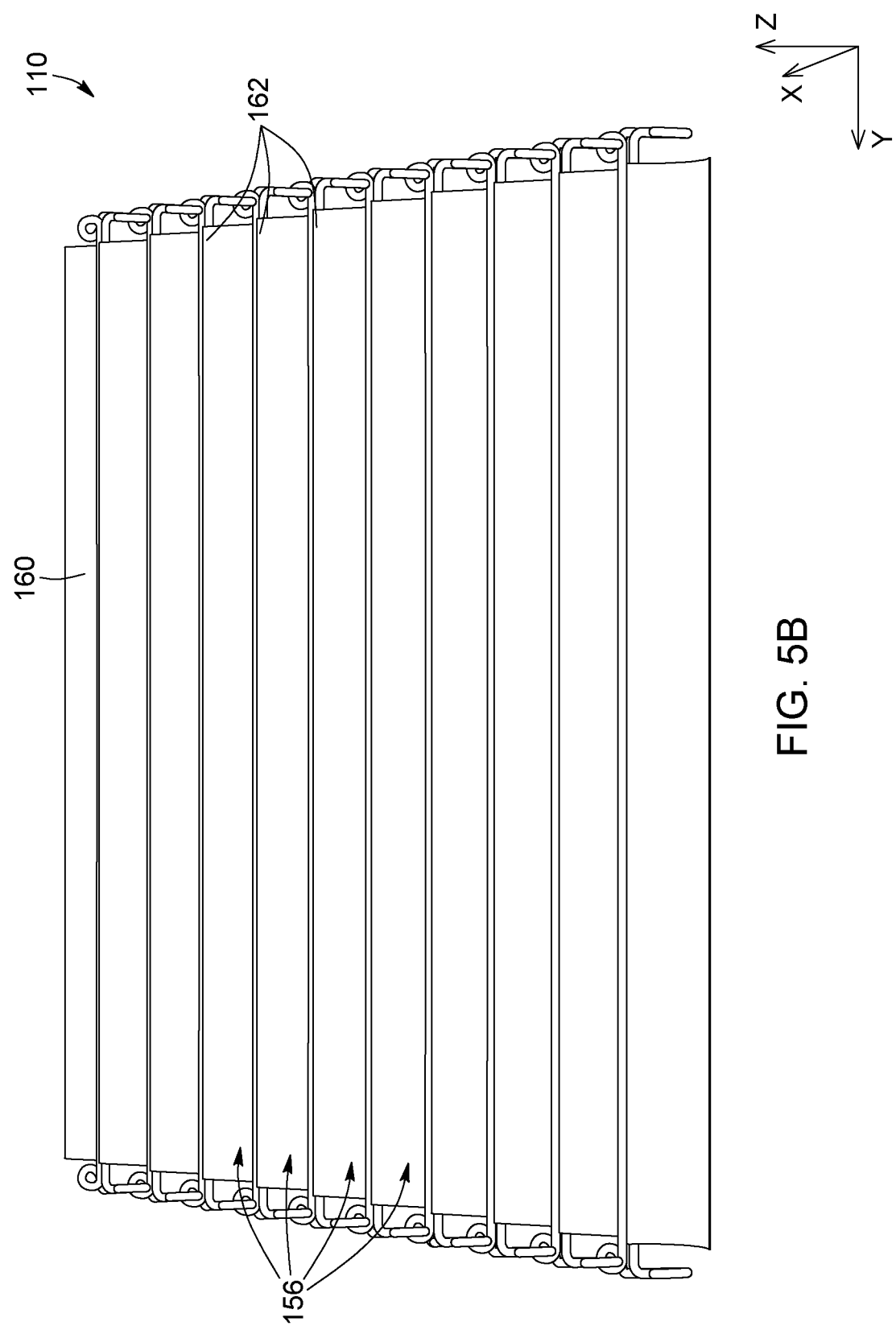

The upper filtering membrane engaging member 134 and the lower filtering membrane engaging member 136 are spaced apart vertically (i.e. along the vertical axis Z), thereby defining an opening therebetween to allow the filtering membrane 160 to be inserted inbetween and to successively substantially contour the upper filtering membrane engaging member 134 and the lower filtering membrane engaging member 136 (see FIGS. 5*a* and 5*b*). In other words, the upper filtering membrane engaging member 134 and lower filtering membrane engaging member 136 are positioned in an upper/lower configuration with respect to the vertical axis Z, when the filtering membrane support 130 is configured in the operating configuration in the fry pot of the deep fryer. In the embodiment shown, the upper filtering membrane engaging member 134 and the lower filtering membrane engaging member 136 are also spaced apart longitudinally (i.e. along the longitudinal axis X of the resulting filtering membrane support 130), but one skilled in the art will understand that, in an alternative embodiment, they could be substantially aligned longitudinally.

In the embodiment shown, each link 132 is formed of a thread with bended sections in order to define the outline of the link 132. The bended thread defines the transversally extending upper filtering membrane engaging member 134, the transversally extending lower filtering membrane engaging member 136, and link engaging sections 146*b* positioned at opposed ends of the upper filtering membrane engaging member 134 and the lower filtering membrane engaging member 136. Each one of the link engaging sections 146*b* includes a connecting assembly 146*c*. The connecting assemblies 146*c* allow adjacent links 132 to be pivotally engaged together and thereby form the filtering membrane support 130. Hence, two adjacent links 132 are pivotally engageable with one another, through the link engaging section 146*b* of one link 32 being pivotally engageable with a corresponding link engaging section 146*b* of an adjacent link 132.

In the embodiment shown, each connecting assembly 146*c* includes a connecting loop 140*a* at a first end and a receiving ring 138*a* at a second end. The connecting loop 140*a* of one link 132 is insertable in the receiving ring 138*a* of an adjacent link 132 to pivotally engage adjacent links 132 to one another, in cascade.

One skilled in the art will understand that, in an alternative embodiment, other connecting assemblies which allow adjacent links 132 to be pivotally connectable to one another can also be provided. For example and without being limitative, in an embodiment (not shown), similarly to the first embodiment described above, each one of the link engaging sections 146b can include a wall assembly with a receiving bore at a first end and an extension pin at a second end, with the extension pin being engageable in a respective one of the receiving bores of an adjacent link 132, to pivotally engage two links 132 together, to define the connecting assembly thereof.

Moreover, it will be understood that, in another alternative embodiment, (not shown), the upper filtering membrane engaging member 134 and the lower filtering membrane engaging member 136 can also be embodied by a component different than the thread of the embodiment shown. For example and without being limitative, the upper filtering membrane engaging member 134 and/or the lower filtering membrane engaging member 136 can be defined by a wall extending transversally.

Now referring to FIGS. 5a and 5b, in the embodiment shown, when the filtering membrane 160 is engaged to the filtering membrane support 130 (i.e. the filtering membrane 160 successively substantially contours the upper filtering membrane engaging members 134 and the lower filtering membrane engaging members 136 of the successive links 132 connected to define the filtering membrane support 130), the filtering membrane 160 is supported and maintained by the filtering membrane support 130 and follows a wave pattern. The wave pattern includes crests 162 and troughs 164 and defines a transversally extending particle retaining cavity 156 for each trough 164 located between two adjacent crests 162.

Hence, it will be understood that the filtering membrane 160 and the filtering membrane support 130 cooperate to define the particle retaining cavity 156 and thereby provide filtration of the cooking oil inside the fry pot 18 of the deep fryer 16 and removal of cooking particles from the cooking oil when the mechanical filter 110 is removed from the fry pot.

One skilled in the art will understand that, in an alternative embodiment (not shown), the filtering membrane 160 can follow a path distinct than the path of the embodiment shown (i.e. a path where the filtering membrane 160 continuously progresses along the longitudinal axis X while contouring successive upper filtering membrane engaging members 134 and lower filtering membrane engaging members 136), in order to define the particle retaining cavities 156 when inserted in the filtering membrane support 130. For example and without being limitative, in an embodiment (not shown) the filtering membrane 160 can follow a path where it contours successively upper filtering membrane engaging members 134 positioned forwardly of lower filtering membrane engaging members 136 (i.e. a path where the filtering membrane 160 is brought rearwardly in order to contour each lower filtering membrane engaging members 136 following the engagement with an upper filtering membrane engaging members 134), or any other paths resulting in the filtering membrane 160 defining particle retaining cavities 156.

The filtering membrane support 130 shown in the embodiment of FIGS. 5a to 7 is an exemplary embodiment of a filtering membrane support 130 manufactured using a design intended to contribute to substantially low manufacture cost of the resulting mechanical filter 110, including the filtering membrane 160 and the filtering membrane support 130. Such substantially low manufacture cost can allow the mechanical filter 110 to be replaced after each use, for convenience of the users, instead of requiring replacement of the filtering membrane 160 inside a reusable filtering membrane support 130.

In view of the above, in order to perform filtering of the cooking oil of a deep fryer 16 during the cooking of food therein, in the embodiment shown in FIGS. 5 a to 7, the filtering membrane 160 is engaged in the above described filtering membrane support 130 such that it contours the upper filtering membrane engaging members 134 and the lower filtering membrane engaging members 136 of the links 132 connectable to define the filtering membrane support 130. The mechanical filter 110 is subsequently inserted into the fry pot of a deep fryer, in the cold zone, and maintained therein for a desired time period. When the mechanical filter 110 is oriented in the substantially vertical orientation (for example during insertion and removal thereof from the fry pot), the mechanical filter 110 operates to retain the cooking particles in the particle retaining cavities 156 formed by the filtering membrane 160. Given that the filtering membrane 160 is permeable to oil, cooking oil is drained from the corresponding particle retaining cavity 156 while the cooking particles are maintained therein.

Now discussing the filtering membrane 60, 160 in more details, in an embodiment, the filtering membrane 60, 160 is a membrane permeable to cooking oil and is made of flexible heat resistant fabric composed of synthetic fibers such as, for example and without being limitative, Insulflex®, Kevlar®, Nomex®, Ryton®, Procon®, Teflon® or the like. The heat resistant fabric of the filtering membrane 60, 160 is capable of sustaining the heat of the cooking oil in the cold zone 20 during extended time periods where the mechanical filter 10, 110 remains in the cold zone of the deep fryer 16. As will be apparent to one skilled in the art, the filtering membrane 60, 160 is permeable to the cooking oil of the fry pot 18 of the deep fryer 16, but retains cooking particles, in order to allow the removal of the cooking particles from the cooking oil, when the mechanical filter 10 is removed from the deep fryer 16. In an embodiment, the filtering membrane 60, 160 is a 30 or 50 microns membrane filtering membrane, i.e. the filtering membrane 60, 160 captures particles of 30 or 50 microns or more. One skilled in the art will however understand that, in alternative embodiments, filtering membranes of a different grade can also be used.

In an embodiment, the filtering membrane 60, 160 includes two outer liners defining a filtering powder pocket (not shown) with filtering powder inserted and contained inbetween. The at least one filtering powder pocket allows the filtering powder to be introduced and retained inside the pocket, while still permitting the insertion of the filtering membrane 60, 160 into the filtering membrane support 30, 130, as described in more details below. In an embodiment, the filtering powder pocket covers substantially the entire surface of the filtering membrane 60, 160. The filtering powder may be any type of filtering powder configured to reduce degradation of the cooking oil over time, for example by absorbing dissolved impurities, such as, without being limitative, aluminum silicate, magnesium silicate or the like.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A filtering membrane support configured to receive a filtering membrane therein to form a mechanical filter for a deep fryer having a fry pot, the filtering membrane support comprising:
a plurality of links pivotally connected to one another, each one of the plurality of links comprising a particle retaining member and a filtering membrane retaining member cooperating therewith to maintain the filtering membrane engaged inbetween.

2. The filtering membrane support of claim 1, wherein the particle retaining member comprises:
a particle receiving section including a particle retaining wall defining a particle retaining cavity in combination with the filtering membrane; and
at least one link engaging section pivotally engageable with a corresponding link engaging section of an adjacent one of the plurality of links.

3. The filtering membrane support of claim 2, wherein the particle retaining wall comprises at least one oil runoff aperture defined therein.

4. The filtering membrane support of claim 2, wherein the particle retaining wall includes a first wall section and a second wall section defining an oblique angle, the first wall section and the second wall section of the particle retaining wall together forming the particle retaining cavity in combination with the filtering membrane.

5. The filtering membrane support of claim 4, wherein the particle retaining wall comprises a plurality of spaced-apart oil runoff apertures defined at a junction of the first wall section and the second wall section thereof.

6. The filtering membrane support of claim 1, comprising two link engaging sections with each one of the two link engaging sections comprising a wall assembly extending from a respective end of the particle retaining wall and closing laterally the particle retaining cavity.

7. The filtering membrane support of claim 6, wherein each wall assembly comprises a receiving bore and an extension pin, the extension pins of a first one of the links being engageable in a respective one of the receiving bores of a second one of the links.

8. The filtering membrane support of claim 6 wherein the filtering membrane retaining member comprises a first end pivotally engaged to a first one of the two link engaging sections and a second end removably engageable to a second one of the two link engaging sections.

9. The filtering membrane support of claim 1, further comprising at least one handle mounted to the filtering membrane support, the at least one handle being engageable to an upper edge of the fry pot when the mechanical filter is inserted therein.

10. A filtering membrane support to define a mechanical filter for a deep fryer having a fry pot in combination with a filtering membrane, the filtering membrane support comprising a plurality of links pivotally connected to one another, each link comprising an upper filtering membrane engaging member and a lower filtering membrane engaging member vertically spaced apart from one another.

11. The filtering membrane support of claim 10, wherein each one of the plurality of links comprises at least one link engaging section being pivotally engageable with a corresponding link engaging section of an adjacent one of the plurality of links.

12. The filtering membrane support of claim 11, wherein each one of the at least one link engaging section comprises a connecting assembly comprising a connecting loop at a first end and a receiving ring at a second end.

13. The filtering membrane support of claim 11, wherein each one of the plurality of links of the filtering membrane support comprises two link engaging sections, each one of the two link engaging sections being positioned at an end of the upper filtering membrane engaging member and the lower filtering membrane.

14. A mechanical filter for a deep fryer having a fry pot, the mechanical filter comprising:
a plurality of links pivotally connected to one another, each one of the plurality of links comprising a particle retaining member including:
a particle receiving section including a particle retaining wall defining a particle retaining cavity; and
at least one link engaging section pivotally engageable with a corresponding link engaging section of an adjacent one of the plurality of links.

15. The mechanical filter of claim 14, wherein the particle retaining wall comprises at least one oil runoff aperture defined therein.

16. The mechanical filter of claim 14, wherein the particle retaining wall includes a first wall section and a second wall section extending spaced-apart from the first wall section to form together the particle retaining cavity.

17. The mechanical filter of claim 16, wherein the particle retaining wall comprises a plurality of spaced-apart oil runoff apertures defined at a junction of the first wall section and the second wall section thereof.

18. The mechanical filter of claim 14, comprising two link engaging sections with each one of the two link engaging sections comprising a wall assembly extending from a respective end of the particle retaining wall and closing laterally the particle retaining cavity.

19. The mechanical filter of claim 18, wherein each wall assembly comprises a receiving bore and an extension pin at a second end, the extension pins of a first one of the links being engageable in a respective one of the receiving bores of a second one of the links.

20. The mechanical filter of claim 14, further comprising at least one handle securable to at least one of the links, the at least one handle being engageable to an upper edge of the fry pot when the mechanical filter is inserted therein.

* * * * *